(12) United States Patent
Porter

(10) Patent No.: US 6,533,171 B1
(45) Date of Patent: Mar. 18, 2003

(54) ELECTRONIC BUSINESS CARD EXCHANGE

(75) Inventor: Lawrence Leon Porter, Lyndhurst (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,656

(22) Filed: Oct. 12, 1999

(30) Foreign Application Priority Data

Oct. 19, 1998 (GB) .............................................. 9822839

(51) Int. Cl.$^7$ ................................................. G06K 5/00
(52) U.S. Cl. .............................. 235/380; 902/39; 705/1
(58) Field of Search ................................ 235/380, 487, 235/492, 441; 902/37, 39, 41; 705/1, 500; 340/693.3

(56) References Cited

U.S. PATENT DOCUMENTS

| | | | | |
|---|---|---|---|---|
| 4,945,219 A | * | 7/1990 | Tanaka | 235/487 X |
| 5,434,395 A | * | 7/1995 | Storck et al. | 235/380 |
| 5,493,105 A | * | 2/1996 | Desai | 235/375 |
| 5,515,031 A | * | 5/1996 | Pereira et al. | 340/693.3 |
| 5,739,512 A | * | 4/1998 | Tognazzini | 235/380 |
| 5,818,442 A | * | 10/1998 | Adamson | 345/753 |
| 5,936,542 A | * | 8/1999 | Kleinrock et al. | 235/380 X |
| 6,010,066 A | * | 1/2000 | Itou et al. | 235/380 X |
| 6,254,001 B1 | * | 7/2001 | Chan | 235/380 |
| 6,454,164 B1 | * | 9/2002 | Wakabayashi et al. | 235/380 |
| 2002/0023952 A1 | * | 2/2002 | Sakanashi et al. | 235/380 |
| 2002/0087353 A1 | * | 7/2002 | Han | 705/1 |

FOREIGN PATENT DOCUMENTS

| | | | |
|---|---|---|---|
| EP | 0 538 216 A1 | | 4/1993 |
| EP | 0 923 040 A2 | * | 6/1999 |
| FR | 2 713 058 A1 | * | 6/1995 |
| GB | 2328304 A | | 2/1999 |
| JP | 7-64923 A | * | 3/1995 |
| JP | 8-8962 | | 12/1996 |
| JP | 10-143475 A | * | 5/1998 |
| JP | 11-85930 A | * | 3/1999 |

OTHER PUBLICATIONS

Schaek, et al.(1998)"How to write OpenCard card services For Java Card applets", http://www.javaworld.com/javaworld/jw–10–1998/jw–10–javadev.html, Oct. 1998.

(1997)"vCard: The Electronic Business Card", Version 2.1, A versit Consortium White Paper, http://www.imc.org/pdi/vcardwhite.ht, Jan. 1997.

\* cited by examiner

Primary Examiner—Michael G. Lee
Assistant Examiner—Jared J. Fureman
(74) Attorney, Agent, or Firm—Scully, Scott, Murphy & Presser; Louis P. Herzberg

(57) ABSTRACT

This invention relates to the electronic distribution of business card information. There is provided a method and apparatus for distributing smart card information comprising the steps of:

acquiring electronic information from a first smart card; acquiring an electronic address from a second smart card; and sending the information from the first smart card to the electronic address of the second card. This allows electronic information from one smart card to be sent to an e-mail location contained on another smart card without the e-mail location of the second smart card being manually entered by the card carrier.

7 Claims, 2 Drawing Sheets

ELECTRONIC BUSINESS CARD EXCHANGE

This invention relates to the electronic distribution of data across the Internet, and more specifically to the electronic distribution of business card information.

BACKGROUND OF THE INVENTION

The success of an organization can partially hinge upon the creation of a wide network of business contacts. Knowing where to find information and who to call upon for that information is vital. At present, this process is for the most part facilitated via a paper-based system. Business cards, containing contact information such as the name, job title, address and telephone number, provide the most commonplace means of exchanging useful follow-up details. This method, however, is not ideal since it has a number of problems associated with The high rate at which business cards are exchanged can result in a person accumulating an excessive number of cards and to organize the cards into a useful format can become extremely labor intensive.

Furthermore an individual is required to carry a sufficient number of business cards for exchanging and needs to estimate the number of cards necessary. He must also remember to carry them and store them somewhere on his person.

Moreover a restriction is placed on the amount of information that can be included on business card.

Another disadvantage is that a change in business details can result in cards being wasted and new ones having to be printed.

Yet another occurs upon exhaustion of the current supply, a new set has to be printed which will incur cost, take time and be inconvenient.

There have been a number of attempts to overcome the problems above. Most of these have involved the conversion of paper-based business card details into a more useful electronic format. Some examples are given below.

Using Card Image Scanners ordinary business cards are collected and scanned as images and then subject to text recognition before being inserted into a database. The process is manually intensive, error-prone and information is limited to what can sensibly be included on a physical business card. A variation is where the scanner is carried into the field, attached to a PC or PDA. This can be even more manually intensive.

E-mail business cards are already in use, for example the "vCard" is one well-know format described in a white paper 'vCard: The Electronic Business Card'. These data files are automatically attached to your outgoing e-mails but one needs to know the e-mail address of the recipient (usually from a paper business card!) before you can send him/her your vCard. Again this is manually intensive and also requires business cards (or at least e-mail addresses) to be carried.

Multi-application smart cards are now coming into general use. These usually contain identification material, including cryptographic keys. Such cards can be used to carry a business card applet. However all known existing applications require a GUI and/or manual activity to power up a PC and/or interaction with an application. None of them currently uses e-mail, or automatic generation of nail, or a low-cost embedded Java device. For instance, >How to write OpenCard services for Java Card applets=by Thomas Schaeck with Rinaldo Di Giorgio describes an application that allows business card information to be stored, edited and exchanged between smart cards.

All the above approaches require user interaction in some way to facilitate the exchange of information. An exchange of card details from two cards requires interaction from two users. An exchange of card details for more than two cards requires multiple user interaction. This can be inconvenient, especially for more than two exchanges and leaves room for user error.

SUMMARY OF THE INVENTION

In one aspect of the present invention there is provided a method of distributing smart card information comprising the steps of: acquiring electronic information from a first smart card; acquiring an electronic address from a second smart card; and sending the information from the first smart card to the electronic address of the second card. This allows electronic information from one smart card to be sent to the electronic address contained on another smart card without the electronic address of the second smart card being manually entered by the card carrier.

This invention provides a low-cost low-effort solution by combining Smart Card technology, embedded systems and standard e-mail. The individual's personal details are carried in an applet on a smart card device such as a Java Ring (TM) or IButton or traditional Smart Card. Low-cost, network-attached readers are provided in locations where business cards are normally exchanged. The act of inserting two Smart Card devices into the reader automatically starts up an application which reads the details (including the electronic addresses) from the two cards. The application then e-mails the business card details of one participant to the e-mail address of the other, and vice versa. Optionally, a mail agent at the recipient's mail server automatically files the business card details in the correct place. Alternatively the recipient can file the e-mail in a special business contacts folder manually when next accessing his/her e-mail.

Advantageously the method also comprises the steps of: acquiring a further electronic address from the first card and acquiring further electronic information from the second card and sending the further business information to the further electronic address. In this way an exchange of electronic information is enabled between two smart card carriers without manual entry of the electronic addresses. This is particularly useful for business information of the type carried on a paper business card which may be stored in electronic form on the smart card.

The information and e-mail locations from the first and second smart cards may be acquired, on insertion of the first smart card into a first smart card reader and on insertion of the second smart card into a second smart card reader, by reading substantially simultaneously the first and second smart cards. This allows a positive indication of which smart cards to exchange electronic information on.

Most advantageously the method comprises the step of acquiring yet a further electronic address and yet further business information from a third smart card and sending the yet further business information to the electronic address of the first and second smart cards and sending the business information of the first and second smart cards to the electronic address of the third smart card. In this way an exchange of business information between three parties is enabled without manual entry of the electronic addresses. This method may also be extended to more than three parties.

The information and e-mail locations may be acquired, on insertion of the first smart card into a smart card reader, by reading the first smart card, and on removal of the first smart card and insertion of the second smart card into the same smart card reader, by reading the second smart card. This allows minimum apparatus requirements to be used for the invention through the use of a single smart card reader. The reading of the first smart card and subsequent reading of the second smart card may be done within a defined time period. The time period may be indicated by a visual or audible signal. The method may further acquire further electronic information and electronic address from a further smart card for exchange of information between multiple parties by removing the previous smart card and inserting the further smart card into the same card reader. The further smart card should be inserted within the defined time period.

A further aspect of the invention provides a method of distributing smart card information comprising the steps of: acquiring information from a first smart card; characterized by sending the information from the first smart card to an electronic address acquired from a second smart card.

Yet a further aspect of the invention provides apparatus for distributing smart card information comprising: means for acquiring electronic information from a first smart card; means for acquiring an electronic address from a second smart card; and means for sending the information from the first smart card to the electronic address of the second card.

A further aspect of the invention provides a computer program product recorded on a medium for carrying out a method of distributing smart card information comprising the steps of: acquiring electronic information from a first smart card; acquiring an electronic address from a second smart card; and sending the information from the first smart card to the electronic address of the second card.

Another aspect of the invention provides a means for transferring personal data electronically comprising: identifying the information to be transferred; selecting the application capable of performing this action; sending the data to the destinations specified; and filing it away in a suitable place and format.

In this way a large amount of bulky data is not accumulated daily. It is only necessary to carry ones own details around and only one copy at that. Information is less likely to become unruly, since it is stored electronically.

The personal data comprises business card details and is encoded using Smart Card technology. The application capable of accessing the information contained within is a Java Card Applet, which constructs two standard electronic address messages containing this information and forwards them to the addresses cited. The notes can then be suitably filed.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
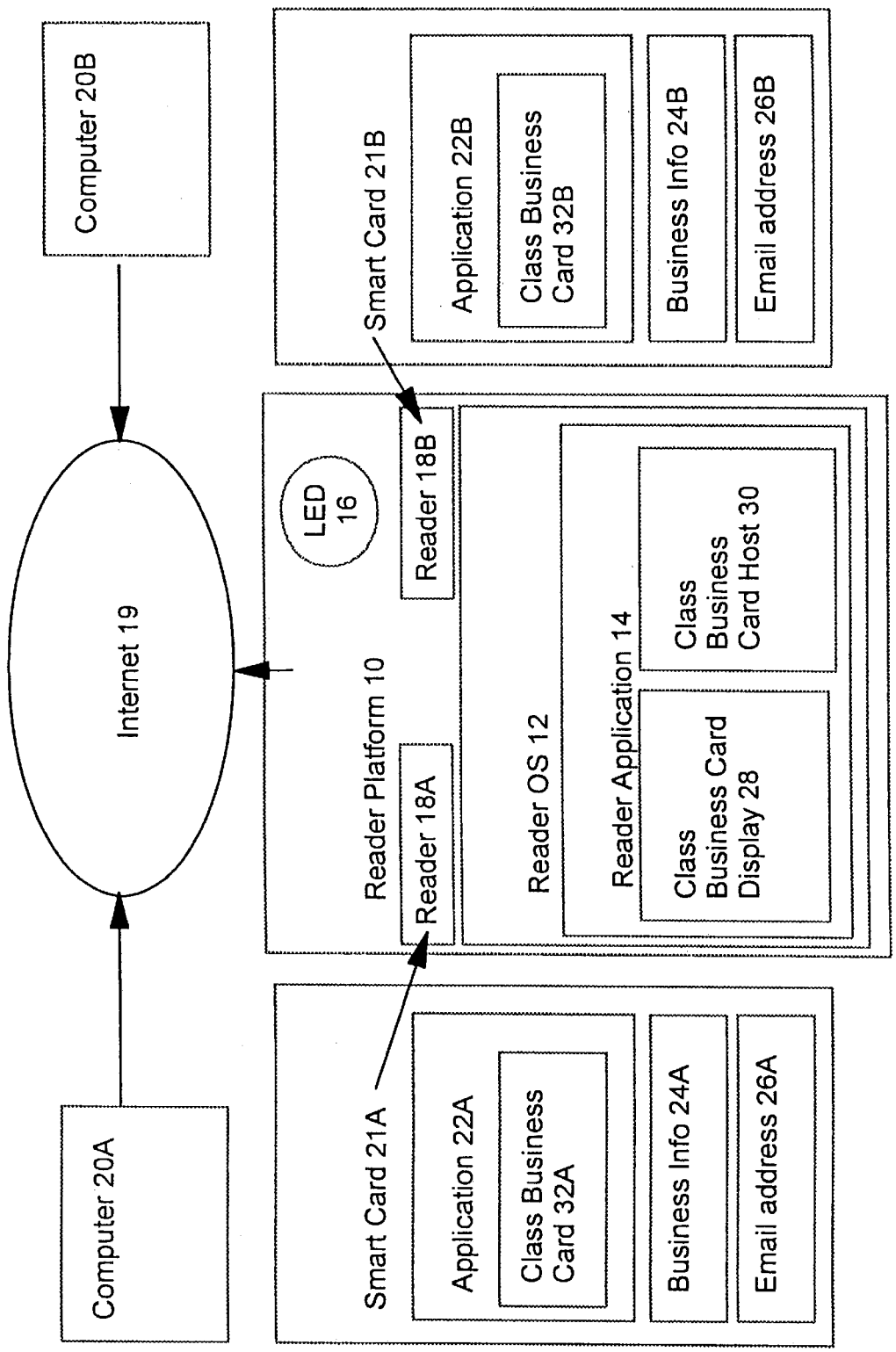
FIG. 1 is a schematic representation of a system embodying the present invention.

An embedded processor platform 10 (such as a MIPS or ARM processor) running an embedded real time operating system 12 (RTOS) such as VxWorks or QNX and implementing embedded Java is capable of loading into memory a smart card reader application 14 (see FIG. 1). The platform 10 has no graphical user interface but a simple light or LED display 16 to signal the user. The platform has a serial port to which is attached a dual smart card reader 18A,B (for instance a Dallas Semiconductor dual Button reader) and a smart card reader driver. The platform 10 has a network connection using TCP/IP to the Internet 19 by attachment to a LAN or by dialing into a network provider. Also connected to the Internet are computers 20A,B having known e-mail locations typically receiving their e-mail from intermediary mail servers. Typically the platform 10 would be recessed into the wall of a building with only the smart card holders 18A,B and the LED 16 visible, taking up less space than a light switch.

The reader device is responsible for accessing the business card details contained within two smart cards.

The Java Applet within the embedded processor communicates with smart card reader, and consequently the inserted smart cards, via standard smart card protocols. The protocol used in the present embodiment is the Application Protocol Data Units (APDU).

The reader application is a Java application communicating with the smart cards using the standard Smart Card protocols. Two of the main classes of the reader application are Class Business Card Host 28 and Class Business Card Display 30 (see FIG. 1). Class Business Card Display 30 controls the sending of e-mails and controls any GUI interface that may be present although the present embodiment has no such GUI interface. It comprises a main method which, on execution, creates a Class Business Card Host object. The Class Business Card Host includes a method for reading information from a smart card and a method for storing the information received.

Smart cards 21A,B are, for example, IButtons from Dallas Semiconductor or Java Rings (TM) running Java Card software and preloaded with multiple applications and data. One of these applications includes a Class Business Card program object and the data including business information and the e-mail address. The Class Business Card object is a "Jiblet" written in Java. A "Jiblet" is an application for cards which is based on a javacard.framework.Applet set of classes designed for smart cards, one of the features of the special set of classes is that there are no GUI classes. The javacard.framework.Applet depends from java.lang.Object.

Class Business Card includes a method for retrieving the information stored on the card and also a method for storing information on the card.

Figure 2:
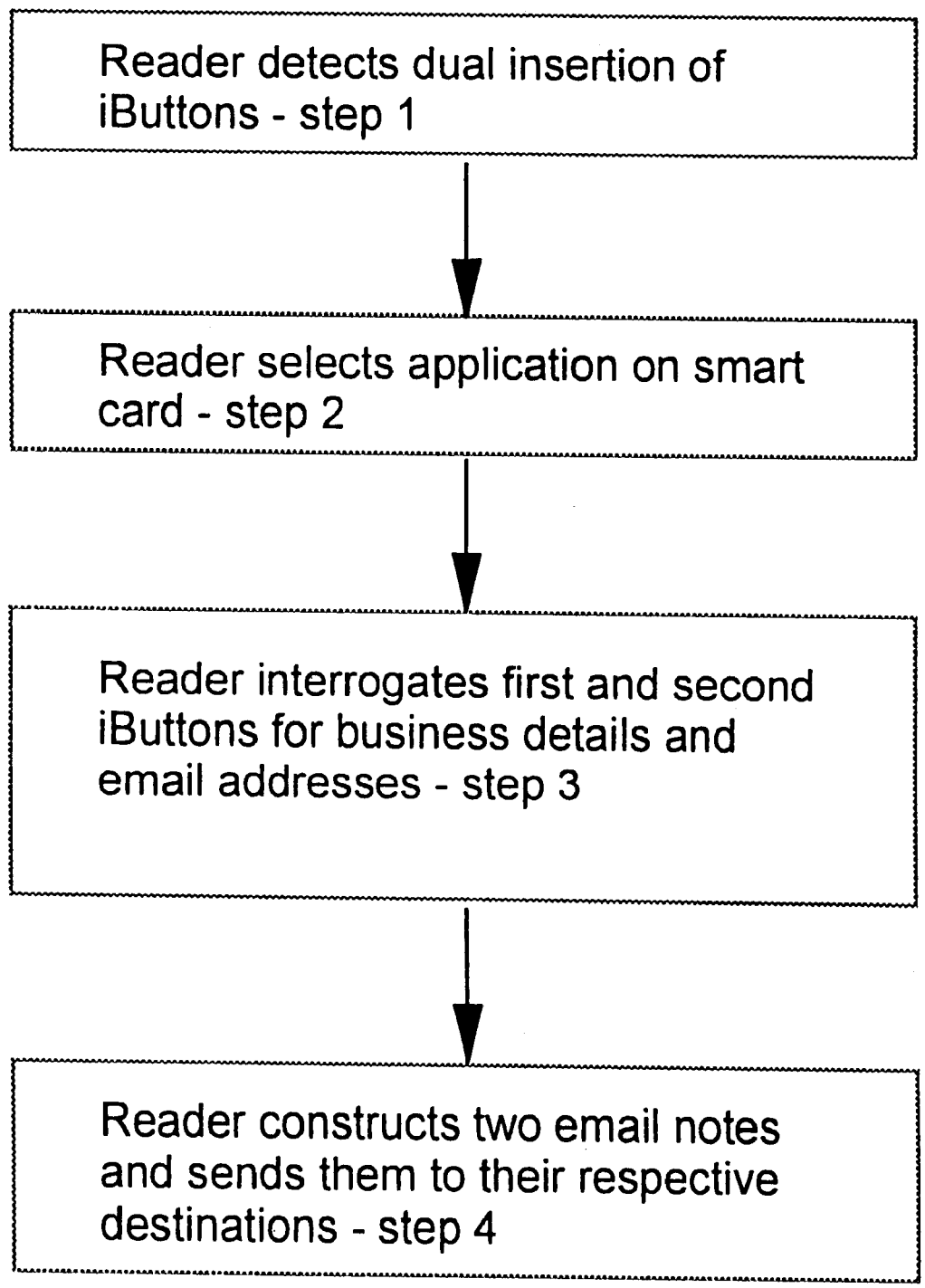
FIG. 2 is a flowchart showing the steps performed by the reader application of the invention.

The steps of the reader application 14 are as shown in FIG. 2. On start up of the platform, the operating system 12 and the application 14 loaded into system memory. The main method of Class Business Card Display 30 is executed and Class Business Card Host 28 is instantiated. Smart card A is inserted into one of the holders, whilst smart card B is inserted into the other. Class Business Card Host 28 poles the card readers 18A,B to detect smart cards. On detecting that smart cards 21A,B have been inserted in the readers 18A,B (step 1), the reader application 14 first sends a command to "select" the business card application 22A,B on both the smart cards (step 2). This is achieved by the calling the read method which sends a APDU message to the Class Business Card objects 32A,B on the smart cards. Retrieve methods on the Class Business Card objects access the memory of the smart cards and fetch the data requested it in the APDU message. The retrieve method then assembles the data into a return APDU message and sends it back to the requesting object. The reader application 14 can interrogate each smart card 21A,B in turn for the business card details 24A,B (step 3) including such items as name, title, address, e-mail address 26A,B (mandatory), telephone number and fax number. Additionally it could include details of the individuals interests, curriculum vitae, a photograph, or other useful information. The application then constructs and sends two standard internet style SMTP/MIME e-mail notes (step 4). The business card details from smart card 21A forming the body of the note and the electronic address specifying the note's final destination. This information is then sent across the Internet via a TCP/IP connection, where it is forwarded to a Mail Server and finally to computer 20B. Exactly the same happens with the business card details on smart card 21B which are packaged together with an electronic address obtained from smart card A and sent across the Internet to a Mail Server. The information is finally forwarded to computer 20A when the computer 20A accesses e-mail.

Both transfers occur simultaneously and the LED on the reader device flashes to indicate that the business card details are on their way across the Internet and that the process is complete.

The embodiment enables the exchange of electronic business card details with the minimum of effort. Two smart card carriers wishing to exchange details walk over to the wall or desk, plug in their smart cards, wait for the light to flash, and the job is done. The components of the system are low cost, both for the smart card device and the reader. The mechanism for delivering the information, standard e-mail, is well-known, easy to understand and use and is also already well integrated with the individual's normal business processes.

Another embodiment comprises only a single reader 18A. A first smart card carrier wishing to exchange information with another inserts his card first and the details including business and e-mail data are read. The card is then removed and the reader indicates using the LED that another card should be inserted. For instance the reader could flash the LED for 10 seconds to give the next card carrier time to insert his card. Details from the second card are read and the e-mail exchange may take place.

This embodiment works well when more a group of more than two people want to exchange cards. The reader could give a subsequent card carrier 10 seconds to insert his card. Once the time period had been exceeded, the application could assume that no more users wished to insert their cards and the e-mail addresses collected so that information can be swapped.

In an alternative embodiment the reader application includes program components for packaging the business information into a specific format required by the recipient's contact database. The data is in the body of the e-mail or alternatively is an attachment to the email. The attachment may be an execution component which updates the recipient's database with the data upon selection and execution. The details of the recipient's database are contained on the recipient's smart card and fetched along with the electronic address, in this way the reader application can pre-format the new information correctly before sending to the recipient.

Although the embodiment is described in terms of an exchange of e-mail over the internet, it is envisaged that other types of electronic address will be used. For instance in the case of automatic updating of a contact database, the electronic address may be an object message address which is sent to the contact database to request it to update itself.

The following is a description of how one embodiment may be used in a conference environment. A conference package of the embodiment contains an "eButton" which can be attached to a key-ring or conference badge. This acts as an electronic business card and is a smartcard running the JavaCard JVM. It contains a person's name and information about the person. It enable exchange of business card details with other conference attendees as painlessly as possible. When attendees get back to their offices they will find the business cards of all those with whom they exchanged details waiting in their Lotus Notes in-basket.

Attendees need go to their nearest free reader attached to PCs and laptops and insert their eButton into either of the slots on a reader. At this stage attendees should not insert more than one eButton. Details will be displayed using a simple Java application and details should be checked and over typed as required. It is most important that the e-mail address is correct which should be an internet e-mail address.

Two attendees can exchange cards by going to the nearest blue-dot reader. The first eButton should be pressed to one of the dots until the details come up on the screen. This first eButton should be held in place. The other eButton should be pressed to the other blue dot until the "swapping e-mails!" message has disappeared. Reciprocal e-mails will be sent immediately. 'iButton' and 'Dallas Semiconductor' are registered trademarks of Dallas Semiconductor Corp.

Advantageously the method also comprises the steps of: acquiring a further electronic address from the first card and acquiring further electronic information from the second card and sending the further business information to the further e-mail address. In this way an exchange of electronic information is enabled between two smart card carriers without manual entry of the e-mail addresses. This is particularly useful for business information of the type carried on a paper business card which may be stored in electronic form on the smart card.

What is claimed is:

1. A method of distributing smart card information comprising the steps of: providing a smart card reader at a given location; using the smart card reader to acquire electronic information from a first smart card, including the step of inserting the first smart card into the card reader; using the smart card reader to acquire an electronic address from a second smart card, including the step of inserting the second smart card into the card reader within a defined time period of inserting the first smart card into the card reader; and sending the information from said first smart card to the electronic address of said second smart card.

2. A method as claimed in claim 1, also comprising the steps of: acquiring a further electronic address from said first card and acquiring further electronic information from said second card and sending the further electronic information to the electronic address of said first smart card.

3. A method as claimed in claim 2, further comprising the step of acquiring yet a further electronic address and yet further electronic information from a third smart card and sending the said further electronic information to the electronic locations of said first and second smart cards and sending the electronic information of said first and second smart cards to the electronic address of said third smart card.

4. A method as claimed in claim 3, wherein said electronic information is business card information.

5. A method as claimed in claim 4, characterized in that said business card information is filed away in a business contacts' database at the destination specified by the electronic address.

6. A method as claimed in claim 5, whereby the smart card information further comprises details as to the type of business contacts' database maintained by its carrier and is therefore able to convert the business card information to the relevant format for filing in said business contacts' database.

7. A method according to claim 1, further comprising the step of, the smart card reader providing a visual or audible signal to indicate said defined time period.

* * * * *